(12) United States Patent
Yu et al.

(10) Patent No.: US 10,567,197 B2
(45) Date of Patent: Feb. 18, 2020

(54) QUALITY-OF-SERVICE BASED WIRELESS PARALLEL REDUNDANT PROTOCOL SOLUTION

(71) Applicant: Cisco Technology, Inc., San Jose, CA (US)

(72) Inventors: Bin Yu, Shanghai (CN); Xiang Fang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/008,420

(22) Filed: Jun. 14, 2018

(65) Prior Publication Data

US 2019/0386849 A1 Dec. 19, 2019

(51) Int. Cl.
*H04W 84/12* (2009.01)
*H04L 12/46* (2006.01)
*H04W 24/08* (2009.01)
*H04L 29/08* (2006.01)

(52) U.S. Cl.
CPC .......... *H04L 12/4633* (2013.01); *H04L 67/12* (2013.01); *H04W 24/08* (2013.01); *H04W 84/12* (2013.01)

(58) Field of Classification Search
CPC .... H04L 12/4633; H04L 67/12; H04W 24/08; H04W 84/12
See application file for complete search history.

(56) References Cited

U.S. PATENT DOCUMENTS

| 8,934,420 B2 | 1/2015 | Sivaprakasam |
| 9,491,001 B2 | 11/2016 | Meier |
| 10,299,148 B2 * | 5/2019 | Chang ..................... H04L 47/27 |
| 2009/0175260 A1 * | 7/2009 | Wang .................. H04W 56/001 370/350 |
| 2013/0148641 A1 | 6/2013 | Sivaprakasam et al. |
| 2014/0086136 A1 * | 3/2014 | Angst ..................... H04L 45/24 370/412 |
| 2015/0078333 A1 | 3/2015 | Byers et al. |

(Continued)

OTHER PUBLICATIONS

"On-Board WiFi on Trains", WiFi on Trains, https://www.fluidmesh.com/solutions/on-board-wifi-for-trains/, Fluidmesh Network LLC, downloaded from the Internet on Feb. 13, 2017, 4 pages.

(Continued)

*Primary Examiner* — Lan-Huong Truong
(74) *Attorney, Agent, or Firm* — Edell, Shapiro & Finnan, LLC

(57) ABSTRACT

A method includes receiving, at a first wireless bridge device, a first packet and determining whether the first packet is a first type or a second type. If the first packet is the first type, the first packet is duplicated to generate two duplicated packets. A first one of the duplicated packets is forwarded to a second wireless bridge device via a tunnel between the first wireless bridge device and the second wireless bridge device. A second one of the duplicated packets is forwarded to one or more access points via a first wireless link between the first wireless bridge device and the one or more access points. If the first packet is the second type, the first packet is forwarded to the second wireless bridge device via the tunnel or forwarding the first packet to the one or more access points via the first wireless link.

20 Claims, 9 Drawing Sheets

(56) References Cited

U.S. PATENT DOCUMENTS

2015/0264614 A1    9/2015   Stager et al.
2017/0155590 A1*  6/2017   Dillon .................. H04L 43/0888
2018/0115396 A1*  4/2018   Herr ...................... H04L 1/1835

OTHER PUBLICATIONS

Patrick Mannion, "Startup's dual-radio IC opens door to roaming", May 31, 2004, http://www.embedded.com/electronics-news/4049086/Startup-s-dual-radi . . . , downloaded from the Internet on Feb. 13, 2017, 5 pages.

"Concurrent Dual-Radio Technology", Moxa Dual-Radio Technology, htp://www.moxa.com/Event/IW/2013/Zero/, Industrial Wireless LAN, downloaded from the internet on Feb. 13, 2017, 4 pages.

"Turotial: Roaming with a dual-radio client and PRP", https://www.lancom-systems.de/docs/LCOS-Refmanual/9.10-Rel/EN/Ref . . . , downloaded from the internet on Feb. 13, 2017, 3 pages.

Jalel Ben-Othman, et al., "Energy efficient and QoS based routing protocol for wireless sensor networks", Journal of Parallel and Distributed Computing, 70 (2010) 849-857, Elsevier, www.elsevier.com/locate/jpdc, Mar. 2010, 9 pages.

\* cited by examiner

QUALITY-OF-SERVICE BASED WIRELESS PARALLEL REDUNDANT PROTOCOL SOLUTION

TECHNICAL FIELD

The present disclosure relates to wireless network communications.

BACKGROUND

When a vehicle, such as a high-speed train, is traveling at high-speeds, a wireless client device on the moving vehicle may face challenges maintaining wireless local area network connectivity with wireless access points positioned along the path of travel of the vehicle. One of the goals in such high-speed environments is to minimize roaming latency and packet loss of a wireless client device. A solution based on a parallel redundant protocol (PRP) is promising, as it focuses on how to guarantee a reliable wireless network connection with wireless clients.

DESCRIPTION OF EXAMPLE EMBODIMENTS

Overview

Figure 1:
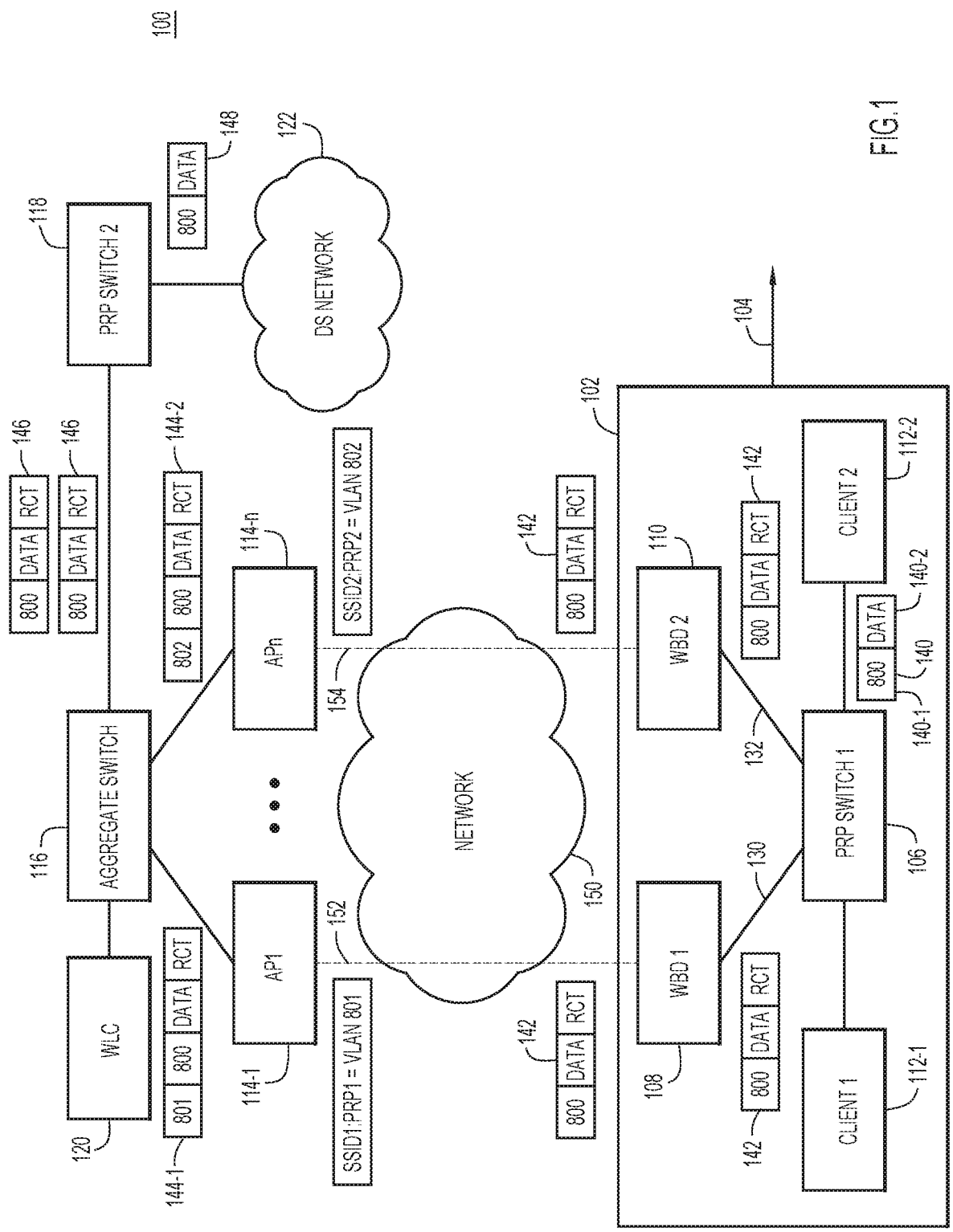
FIG. 1 depicts a communication system that enables wireless network transmissions from and to devices on a moving apparatus, according to an example embodiment.

In one embodiment, a method includes receiving, at a first wireless bridge device, a first packet and determining whether the first packet is a first type or a second type. In response to determining that the first packet is the first type, the first packet is duplicated to generate two duplicated packets. A first one of the duplicated packets is forwarded to a second wireless bridge device via a tunnel between the first wireless bridge device and the second wireless bridge device and is transmitted out via the second wireless bridge device's wireless link. A second one of the duplicated packets is forwarded to one or more access points via a first wireless link between the first wireless bridge device and the one or more access points. In response to determining that the first packet is the second type, the first packet is forwarded to the second wireless bridge device via the tunnel and is transmitted out via the second wireless bridge device's wireless link or forwarding the first packet to the one or more access points via the first wireless link. The first type may indicate that the packet is a high priority packet, while the second type may indicate that the packet is a low priority packet.

Example Embodiments

Techniques presented herein are solutions providing QoS-based PRP network communications. At least two wireless bridge devices (WBDs) are disposed in a vehicle, such as a train, for delivering or receiving packets for one or more client devices (clients) on the vehicle. In some embodiments, a WBD can be a wireless workgroup bridge (WGB). One of the WBDs is designated as a master WBD while the other is designated as a slave WBD. The master WBD receives packets from the clients on the vehicle via a switch. The master WBD determines the type of the received packets. For example, a first type of packets, such as voice data, control message, close-circuit television (CCTV) packets, etc. may be marked as high priority packets; and a second type of packets, such as Internet access requests, may be marked as low priority packets. Based on the determination, the master WBD provides QoS-based services to those packets according to their priority.

In some embodiments, if it is determined that a client packet is the first type, the master WBD duplicates the packet to generate two duplicated packets. One of the duplicated packets is forwarded to the slave WBD via a tunnel between the master WBD and the slave WBD. The other one of the duplicated packets is forwarded to one or more access points via a first wireless link between the master WBD and the one or more access points. If it is determined that a client packet is the second type, the master WBD does not duplicate the packet. The master WBD forwards the packet to the one or more access points via the first wireless link or to the slave WBD via the tunnel. In one embodiment, the packet that is not duplicated is transmitted via a link that has a better link quality to reduce packet loss in the system.

Reference is now made to FIG. 1. FIG. 1 depicts a communication system 100 that enables transmission of packets from and to a moving apparatus according to an example embodiment. The system 100 includes a vehicle 102 configured to move along a pathway 104. In one example, the vehicle is a train car, but this is only an example and it may be any other type of vehicle. The vehicle 102 includes a first PRP switch 106 (denoted PRP switch 1), a first WBD 108 (denoted WBD1), a second WBD 110 (denoted WBD2), and one or more client devices 112-1 and 112-2 (denoted Client1 and Client2). Although two client devices are illustrated in FIG. 1, it is to be understood that any number of client device can be included on the vehicle 102. The system 100 further includes a plurality of wireless access points (APs) 114-1-114-$n$ (denoted AP1-APn) disposed along the pathway 104. These wireless APs are part of a wireless network infrastructure and are configured to wirelessly transmit signals to and receive signals from the first WBD 108 and the second WBD 110 when the vehicle 102 moves along the pathway 104. The wireless network infrastructure of the system 100 also includes an aggregation switch 116 coupled to the wireless APs 114, a second PRP switch 118 (denoted PRP switch 2), a wireless LAN controller (WLC) 120, and a distributed system (DS) network 122, which is coupled to the second PRP switch 118.

In one embodiment, when the first PRP switch 106 receives a data packet from one of the clients 112, it duplicates the data packet and forwards one data packet to each of the first WBD 108 and the second WBD 110. For example, as shown in FIG. 1, the client 112-2 transmits a packet 140 to the first PRP switch 106. The packet 140 includes a header 140-1 and a payload 140-2 containing packet data. Upon receiving the packet 140, the first PRP switch 106 duplicates the packet 140 to generate two duplicated packets 142, and adds to each duplicated packet 142 a redundancy control trailer (RCT). The first PRP switch 106 then forwards one duplicated packet 142 to each of the first WBD 108 and the second WBD 110 through the links 130 and 132.

Each of the first WBD 108 and the second WBD 110 in turn forwards the duplicated packet 142 to a connected AP through a wireless network 150. For example, the first WBD 108 wirelessly forwards a duplicated packet 142 to AP1 114-1 via a first wireless link 152 identified by a first service set identifier (SSID1: PRP1), which is a part of a virtual local area network (VLAN) 801. The second WBD 110 wirelessly forwards another duplicated packet 142 to the APn 114-n via a second wireless link 154 identified by a second service set identifier (SSID2: PRP2), which is a part of a virtual local area network (VLAN) 802.

The APs 114-1 and 114-n then add their respective SSID to the packets and forward the packets to the aggregate switch 116. For example, referring to FIG. 1, AP1 forwards packet 144-1 that includes a VALN header 801 indicating the SSID of AP1, and APn forwards packet 144-2 that includes a VALN header 802 indicating the SSID of APn. This ensures that the DS network 122 receives one of the data packets from one of the wireless APs 114 when one of the wireless links 152 and 154 is not functioning.

The aggregate switch 116 is configured to aggregate all the packets it receives from the APs 114, remove the VLAN headers from the packets, and forward the packets to the second PRP switch 118. As shown in FIG. 1, the aggregate switch 116 receives packet 144-1 from AP1 and receives packet 144-2 from APn. The aggregate switch 116 then removes the VALN headers from the packets 144-1 and 144-2 to generate packets 146, and forwards the packets 146 to the second PRP switch 118.

The second PRP switch 118 receives packets 146 and determines whether they are identical. If the packets are identical, the second PRP switch 118 deletes one of the packets and forwards the remaining one to an upstream client, e.g., DS network 122. Before sending the remaining packet, the second PRP switch 118 removes the RCT added by the first PRP switch 106 and forwards the remaining packet 148 to the DS network 122. The remaining packet 148 is identical to the original packet 140 sent by the client2.

In one embodiment, a downstream traffic can transmit a packet to the vehicle 102 in a similar way as explained above. That is, the second PRP switch 118 duplicates a packet received from an upstream client, e.g., the DS network 122 and forwards the duplicated packets through two different wireless links to the vehicle 102 in a reversed manner to that described above. When the first PRP switch 106 receives the duplicated packets, it removes one of them and sends the remaining packet to a client device 112 connected to the first PRP switch 106.

In addition to ensuring packets sent from a moving vehicle are safely transmitted to a upstream client or vice versa, techniques presented herein also provide a QoS-based PRP solution to improve efficiency of packet transmission and reduce packet loss in the transmission.

Figure 2:
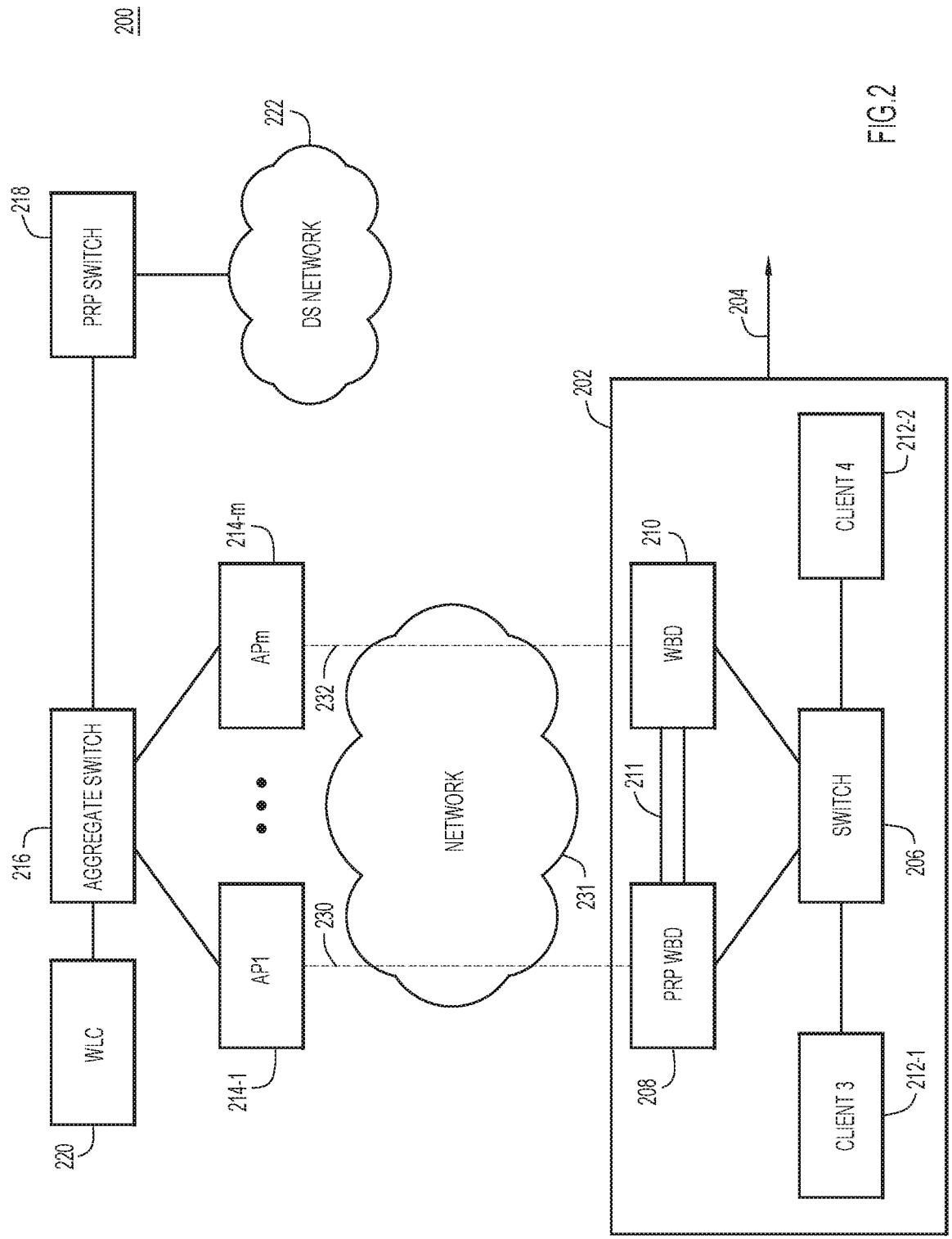
FIG. 2 depicts a communication system that enables a Quality-of-Service (QoS)-based PRP solution for wireless network transmissions, according to an example embodiment.

Reference will now be made to FIG. 2. FIG. 2 depicts a communication system 200 that enables a QoS-based PRP solution for wireless network transmissions according to an example embodiment. The system 200 includes a vehicle 202 configured to move along a pathway 204. In one example, the vehicle is a train car, but this is only an example and it may be any other type of vehicle. The vehicle 202 includes a switch 206, a first WBD 208 (denoted PRP WBD), a second WBD 210 (denoted WBD), and one or more client devices 212-1 and 212-2 (denoted Client3 and Client4). The first WBD 208 is a PRP-enabled WBD. The first WBD 208 and the second WBD 210 are connected through a tunnel 211. In one embodiment, the tunnel can be an Ethernet tunnel. The system 200 further includes a plurality of wireless APs 214-1-214-m (denoted AP1-APm) disposed along the pathway 204. These wireless APs are part of a wireless network infrastructure and are configured to wirelessly transmit signals to and receive signals from the first WBD 208 and the second WBD 210 when the vehicle 202 moves along the pathway 204. The wireless network infrastructure of the system 200 also includes an aggregation switch 216 coupled to the wireless APs 214, a PRP switch 218, which is connected to an upstream client, a wireless LAN controller (WLC) 220, and a distributed system (DS) network 222, which is coupled to the PRP switch 218.

To transmit client packets from the vehicle 202 to upstream client 222, at least two WBDs are employed in the vehicle 202. One of the WBDs is designated a master WBD while the other WBD are designated as slave WBD. Referring to FIG. 2, two WBDs 208 and 210 are deployed to the vehicle 202. For example, the first WBD 208 is designated the master WBD while the second WBD is designated as the slave WBD. At the outset, a packet is sent from one of the clients 212 to the switch 206. The packet is then forwarded to the master WBD 208. Upon receipt of the packet, the master WBD 208 determines whether the packet is a first type or a second type. In one embodiment, the first type of packets are high priority packets, such as voice data, control messages, Close-Caption Television (CCTV) packets, etc. The second type of packets are low priority packets, such as Internet access requests or other packets the loss of which would not significantly affect the user experience or the operation of system 200. These classifications of packets are merely examples, and are not intended to limit the scope of the embodiments. Other classifications of packets may be employed.

In some embodiments, the determination is based on a packet type indicator included in the packet. For example, a packet may be marked as either PRP-capable, meaning the packet is to be sent under a PRP operation, or PRP-incapable, meaning no PRP operation is needed to send the packet. In some embodiments, a one-byte trailer can be added to every packet, and an indicating bit, e.g., the least significant bit or any other bit, of the trailer can be used to indicate whether the packet should be duplicated.

When the master WBD 208 determines that the packet is a high priority packet, e.g., the first type of packet, based on the packet type indicator included in the packet, it duplicates the packet to generate two duplicated packets. The master WBD 208 then forwards one of the duplicated packets to AP1 via a first wireless link 230 of network 231 between the master WBD 208 and AP1. The master WBD 208 also forwards another one of the duplicated packets to the slave WBD 210 via the tunnel 211 between the master WBD 208 and the slave WBD 210 to enable the slave WBD to separately forward that packet via a second wireless link 232 between the slave WBD 210 and APm. Upon receiving the duplicated packets, AP1 and APm separately forward the packets to aggregate switch 216, which then sends both packets to the PRP switch 218. The PRP switch 218 examines the packets and determines that they are duplicated packets. The PRP switch 218 deletes one of the duplicated packets and forwards the remaining one to DS network 222.

If the master WBD 208 determines that the packet is a low priority packet, e.g., the second type of packet, it does not duplicate the packet and forwards the packet via the link 230 to AP1 or via the tunnel 211 to the slave WBD 210 to enable the slave WBD 210 to forward the packet via the link 232 to APm. The packet then goes through the aggregate switch 216 and PRP switch 218 to reach to DS network 222. Because this low priority packet is transmitted without being duplicated, the traffic in the network 231 is reduced so that it uses less network resources to reach its destination. Also, because the low priority packet is transmitted via only one of the wireless links 230 and 232, wireless collision is reduced and the end-to-end throughput is improved as a result.

In some embodiments, before the low priority packet is transmitted from the master WBD 208, the master WBD 208 may select a link that has a better quality for the low priority packet. For example, the master WBD can determine the link quality of the wireless link 230 by, for example, measuring the signal strength or packet error rate of the wireless link 230. Also, the master WBD 208 can receive link quality information indicating a link quality of the wireless link 232 from the slave WBD 210 via the tunnel 211 and determine whether the wireless link 230 or the wireless link 232 has a better link quality. For example, the master WBD 208 and the slave WBD 210 are configured to periodically (e.g., every one second) and independently measure the received signal strength or packet error rate of the links 230 and 232. The link quality information may be in the form of, for example, received signal strength or packet error rate, and is stored in the master WBD 208 such that the master WBD 208 can compare the received signal strengths or packet error rates to select a wireless link for the low priority packet. For example, when the link quality of the wireless link 230 is better than that of the wireless link 232, the master WBD 208 forwards the low priority packet via the wireless link 230 to AP1. Or when the link quality of the wireless link 232 is better than that of the wireless link 230, the master WBD 208 forwards the low priority packet via the tunnel to the slave WBD 210 to enable the slave WBD 210 to send the packet via the wireless link 232 to APm. The link quality information is dynamically changed as the vehicle 202 moves along the pathway 204.

In some embodiments, the master WBD 208 and the slave WBD 210 perform computations independently to obtain the link quality information based on, for example, received signal strength indicators or packet error rate. The master WBD 208 stores self-link quality information (i.e., link quality information of the wireless link between the master WBD 208 and one of the APs). The master WBD 208 receives and stores peer-link quality information (i.e., link quality information of the wireless link between the slave WBD 210 and one of the APs) from the slave WBD 210 via the tunnel 211 periodically (for example, every one second). The master WBD 208 is configured to compare the self-link quality information with the peer-link quality information periodically (for example, every one second) and designate the link with the better quality as a feasible link for low priority packets.

In some embodiments, when the master WBD 208 fails to receive link quality information from the slave WBD 210 within a predetermined time period, the master WBD 208 may designate the link it has with one of the APs 214 as a feasible link for low priority packets.

In some embodiments, if the master WBD 208 does not receive any high priority traffic flows for a predetermined time, the master WBD 208 can duplicate partial low priority traffic flows by marking them as high priority, and use these packets to detect the link quality.

In some embodiments, when the master WBD 208 receives a packet from a client 212, the master WBD 208 determines whether the packet includes a packet type indicator. When the master WBD 208 determines that the packet does not include a packet type indicator, the master WBD 208 duplicates the packet to generate two duplicated packets and forwards the duplicated packets via links 230 and 232 to the upstream client 222 as described above.

In some embodiments, the master WBD 208 and the slave WBD 210 are configured to periodically send supervision frames in the system 200 for clients that send high priority packets (high priority clients) and clients that send low priority packets (low priority client). A supervision frame includes a Media Access Control (MAC) address of the sending client device and a link identifier, e.g., an identifier for the link 230 or 232. In one embodiment, a supervision frame is destined to a registered multicast address (e.g., 01-15-4E-00-01-XX) with an Ethertype in an Ethernet frame programed to 0x88FB. In another embodiment, a supervision frame is formulated to comply with IEC 62439-3 (PRP framework), which defines a supervision frame for providing an efficient packet transmission. A PRP module can learn from the periodic supervision frames to determine if a node is a singly attached node (SAN) or a doubly attached node (DAN) because no duplication occurs for a packet from an SAN. In addition, a PRP module can act as a redundancy box that it is able to transmit supervision frames on behalf of clients behind it and maintains a node table to indicate link availability of each client.

For example, the PRP switch 218 can receive supervision frames sent from the master WBD 208 and the slave WBD 210, and extract client information included in the supervision frames to create a node table that indicates the links used to send packets for a respective client device 212. For example, the PRP switch 218 maintains a node table indicating that client device 212-1 is a high priority client because the duplicated packets from the client device 212-1 are sent via both links 230 and 232 and indicating that client device 212-2 is a low priority client because packets from the client device 212-2 are sent via only link 232.

Based on the information stored in the node table, the PRP switch 218 can process a downstream packet directed to a client on the vehicle 202. For example, when the PRP switch 218 receives a downstream packet directed to the client device 212-1, the PRP switch 218 can look up the node table and determines that the client device 212-1 is a high priority client. In response to the determination, the PRP switch 218 duplicates the packet and transmits the duplicated packets via two separate wireless links to the master WBD 208 and the slave WBD 210, respectively. When the PRP switch 218 receives another downstream packet directed to the client device 212-2, the PRP switch 218 can look up the node table and determines that the client device 212-2 is a low priority client. In response to that determination, the PRP switch 218 does not duplicate the packet and transmits the single packet via a single wireless link to the master WBD 208 or the slave WBD 210.

The slave WBD 210 then forwards the packet it receives to the master WBD 208. The master WBD 208 determines whether the packet from the slave WBD 210 and a packet it receives from one of the APs 214 are duplicated packets. If the packets are duplicated packets, the master WBD 208 deletes one of the packets and forwards the remaining packet to the intended client device 212 via switch 206. If the packets are not duplicated packets, the master WBD 208 forwards both packets to their intended client device(s).

Figure 3:
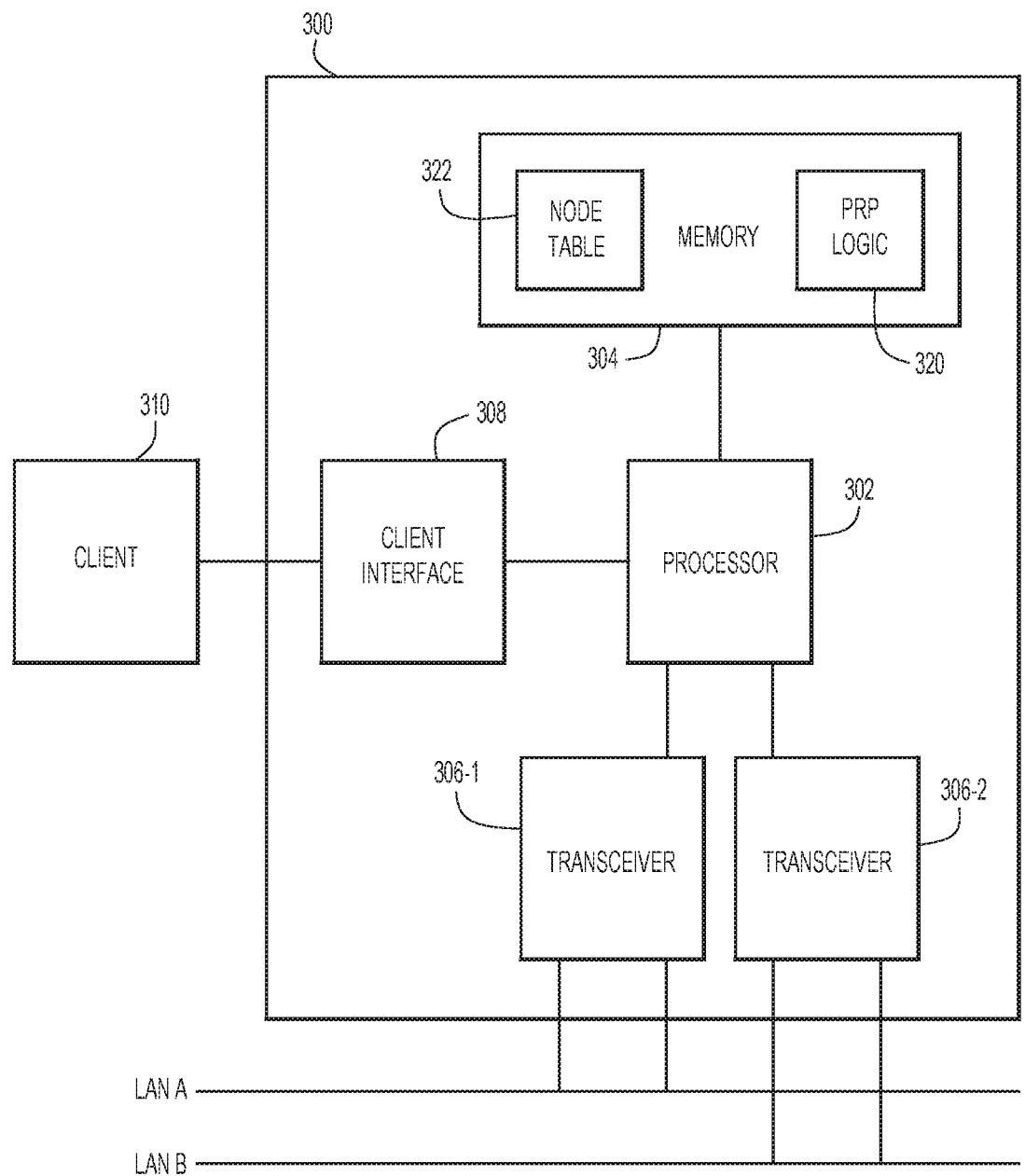
FIG. 3 illustrates a block diagram of a PRP switch configured to participate in a QoS-based PRP solution, according to an example embodiment.

FIG. 3 illustrates a block diagram of an example PRP switch 300 according to an example embodiment. The PRP switch 300 can be any one of the PRP switch 106 and 118 in FIG. 1 and the PRP switch 218 in FIG. 2. The PRP switch 300 includes a processor 302, a memory device 304, two transceivers 306-1 and 306-2, and a client interface unit 308.

The processor 302 may be a microprocessor or microcontroller (or multiple instances of such components) that is configured to execute program logic instructions (i.e., software) for carrying out various operations and tasks described herein. For example, the processor 302 is configured to execute instructions for the PRP logic 320 stored in the memory 304. The PRP logic 320 is configured to perform operations such as determining whether to duplicate a packet directed to a downstream client based on information stored in the node table 322, determining whether two received upstream packets are duplicated packet, deleting one of the duplicated packets and forwarding a remaining packet to an upstream client, etc. Further descriptions of operations performed by the processor 302 when executing instructions stored in the memory 304 will be provided below.

The memory 304 may include read only memory (ROM), random access memory (RAM), magnetic disk storage media devices, optical storage media devices, flash memory devices, electrical, optical or other physical/tangible memory storage devices.

The node table 322 stored in the memory 304 includes client information such as MAC address of clients, wireless link identifiers used by the clients to send packets, and client indicators that identify clients as a high priority client, e.g., a DAN, or a low priority client, e.g., an SAN. The information stored in the node table 322 is used by the processor 304 when executing the PRP logic 322 to process packets. A packet directed to a high priority client is duplicated, while a packet directed to a low priority client would not be duplicated by the processor 302.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

The PRP logic 320 may take any of a variety of forms, so as to be encoded in one or more tangible/non-transitory computer readable memory media or storage device for execution, such as fixed logic or programmable logic (e.g., software/computer instructions executed by a processor), and the processor 302 may be an application specific integrated circuit (ASIC) that comprises fixed digital logic, or a combination thereof.

For example, the processor 302 may be embodied by digital logic gates in a fixed or programmable digital logic integrated circuit, which digital logic gates are configured to execute the PRP logic 320. In general, the PRP logic 320 may be embodied in one or more computer-readable storage media encoded with software comprising computer executable instructions and when the software is executed operable to perform the operations described herein.

The processor 302 is configured to execute instructions stored in the memory device 304 to control signal transmission and reception functions in the transceiver 306-1 and 306-2. In one embodiment, the client interface 308 receives a packet from a client 310 through a wired or wireless connection. After duplicating the packet, the processor 302 may add different PRP trailers to the identical packets. For example, if a packet is to be sent through its LAN_A port, the trailer may include identification indicating network LAN_A. The processor 302 then controls the transceivers 306-1 and 306-2 to send the identical packets with different trailers to downstream devices, e.g., a WBD, an aggregate switch.

In another embodiment, when the transceivers 306-1 and 306-2 receive two identical PRP packets and forward them to the processor 302, the processor 302 is configured to remove one of the packets based on their trailers and forwards the remaining packet, after removing the trailer, to an upstream client 310, e.g., a DS, through client interface 308.

Figure 4:
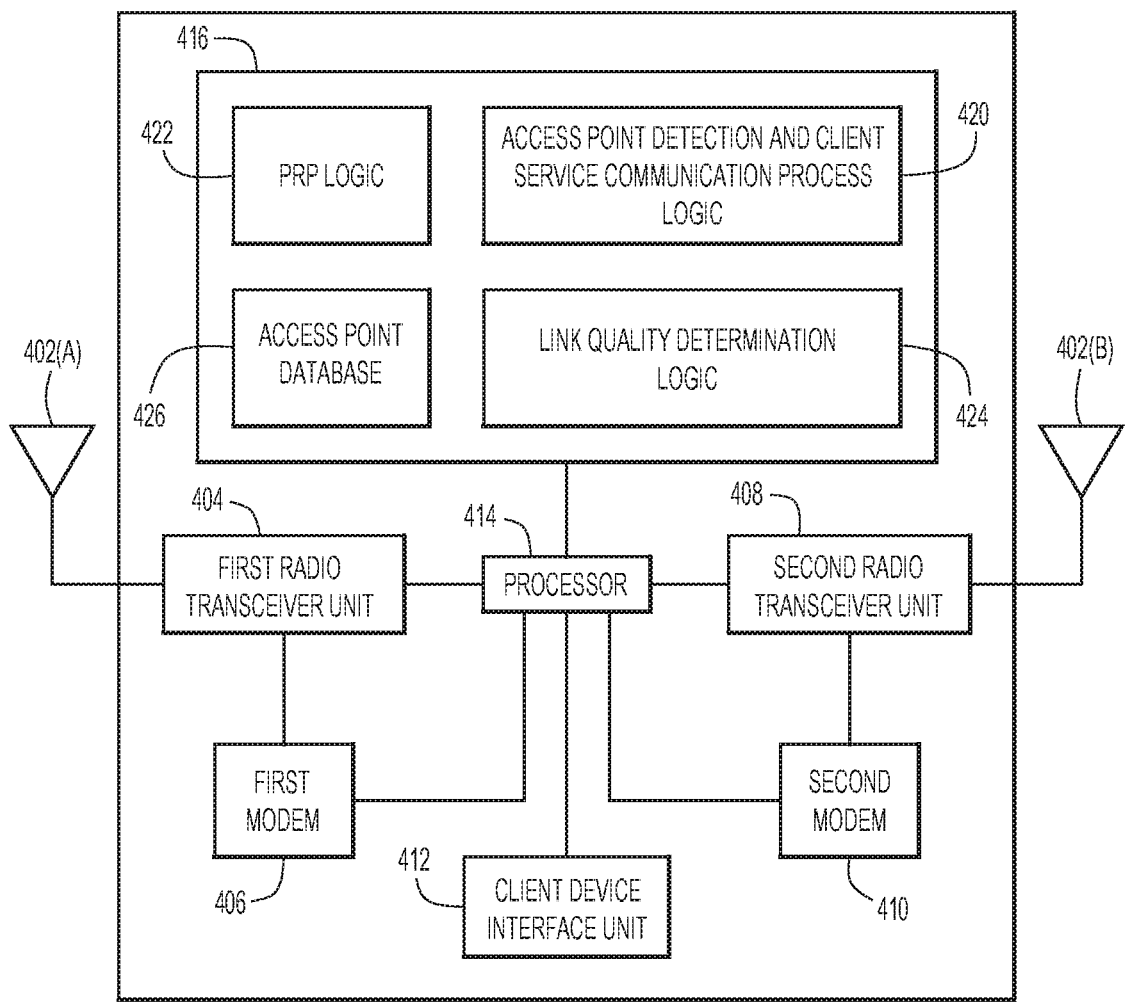
FIG. 4 illustrates a block diagram of a wireless bridge device configured to participate in a QoS-based PRP solution, according to an example embodiment.

FIG. 4 illustrates an example block diagram of a WBD 400 configured to participate in a QoS-based PRP system for packet transmission, according to an example embodiment. The WBD 400 may be any one of the master WBD 208 and the slave WBD 210 in FIG. 2. The WBD 400 includes antennas 402(A) and 402(B), a first radio transceiver unit 404, a first modem 406, a second radio transceiver unit 408, a second modem 410, a client device interface unit 412, a processor 414 and a memory 416. The first radio transceiver unit 404 is coupled to the first antenna 402(A) and to the first modem 406. The first radio transceiver unit 404 and the first modem 406 are coupled to the processor 414. In response to instructions from the processor 414, the first modem 406 generates signals for transmission by the first radio transceiver unit 404 and processes signals received by the first radio transceiver unit 404. The client device interface unit 412 is a network interface device (e.g., Ethernet card) that enables networked communications with the client devices, such as switches 106 and 206 in FIGS. 1 and 2, or with a peer WBD. Although the WBD 400 shows two radio transceiver units, it should be appreciated that the WBD 400 may include any number of radio transceiver units that operate on any number of frequency bands.

The second radio transceiver unit 408 is coupled to the antenna 402(B) and to the second modem 410. The second radio transceiver unit 408 and the second modem 410 are coupled to the processor 414. In response to instructions from the processor 414, the second radio transceiver unit 408 and the second modem 410 are controlled to operate in a manner similar to that of first radio transceiver unit 404 and first modem 406, but on a different frequency band. It should be appreciated that the radio transceiver unit 404 and the second radio transceiver unit 408 can communicate with both the client devices and the APs. The radio transceiver unit 404 and the modem 406 may be embodied in one or more integrated circuits, and the same applies to the second radio transceiver unit 408 and second modem 410.

The radio transceiver units 404 and 408 are configured to receive, via one or more of the antennas 402(A) and 402(B)

downstream wireless communications from one or more APs. The radio transceiver units 404 and 408 are also configured to receive upstream communications from the processor 414, which obtains the upstream communications from the client device interface 412. For example, a switch transmits an upstream packet that is received via the client device interface unit 412, which then supplies the upstream packet to the processor 414. The processor 414 then determines whether to duplicate the upstream packet and transmits the packet via one of the radio transceiver units 404 and 408 to an AP and/or transmit the packet to a peer WBD via the client device interface unit 412. The radio transceiver units 404 and 408 are configured to forward the upstream packet to an appropriate one or more of the APs. The processor 414 is configured to forward a downstream packet (received from one or more of the APs) to an appropriate one or more of a downstream devices, e.g., a switch or a pear WBD, via the client device interface unit 412 or the radio transceiver units 404 and 408.

In FIG. 4, the processor 414 is a microprocessor or microcontroller that is configured to execute program logic instructions (i.e., software) for carrying out various operations and tasks described in this disclosure. For example, the processor 414 is configured to execute AP detection and client service communication process logic 420 that is stored in the memory 416 to provide communication services to the client devices and to scan a frequency band to detect APs in the network. Further, the processor 414 is configured to execute PRP logic 422 stored in the memory 416 to determine whether to duplicate a upstream packet, and execute link quality determination logic 424 to determine wireless link quality of its antenna 402 with one or more APs. When receiving link quality information from a peer WBD, the processor 414 is configured to execute the link quality determination logic 424 to determine whether its link quality is better than the link quality of its peer WBD. As described above, the processor 414 is configured to select a wireless link that has a better quality to transmit a second type of packet (low priority packet) that is not duplicated.

The memory 416 may include read only memory (ROM), random access memory (RAM), magnetic disk storage media devices, optical storage media devices, flash memory devices, electrical, optical or other physical/tangible memory storage devices.

The functions of the processor 414 may be implemented by logic encoded in one or more tangible (non-transitory) computer-readable storage media (e.g., embedded logic such as an application specific integrated circuit, digital signal processor instructions, software that is executed by a processor, etc.), wherein the memory 416 stores data used for the operations described herein and stores software or processor executable instructions that are executed to carry out the operations described herein.

The AP detection and client service communications process logic 420, the PRP logic 422, and the link quality determination logic 424 may take any of a variety of forms, so as to be encoded in one or more tangible/non-transitory computer readable memory media or storage device for execution, such as fixed logic or programmable logic (e.g., software/computer instructions executed by a processor), and the processor 414 may be an application specific integrated circuit (ASIC) that comprises fixed digital logic, or a combination thereof.

For example, the processor 414 may be embodied by digital logic gates in a fixed or programmable digital logic integrated circuit, which digital logic gates are configured to perform the AP detection and client service communication process logic 420. In general, the AP detection and client service communications process logic 420, the PRP logic 422, and the link quality determination logic 424 may be embodied in one or more computer-readable storage media encoded with software comprising computer executable instructions and when the software is executed operable to perform the operations described herein for the process logic 420.

The memory 416 also stores data for an AP database 426. The AP database 426 stores priority and status information associated with the APs in the network. For example, the AP database 426 may indicate the relative priority level of every detected AP in the network (e.g., corresponding to the signal strength between the WBD 400 and each of the APs) and may also indicate whether or not there is an active session (e.g., an active network session) between each of the APs and the WBD 400.

Figure 5:
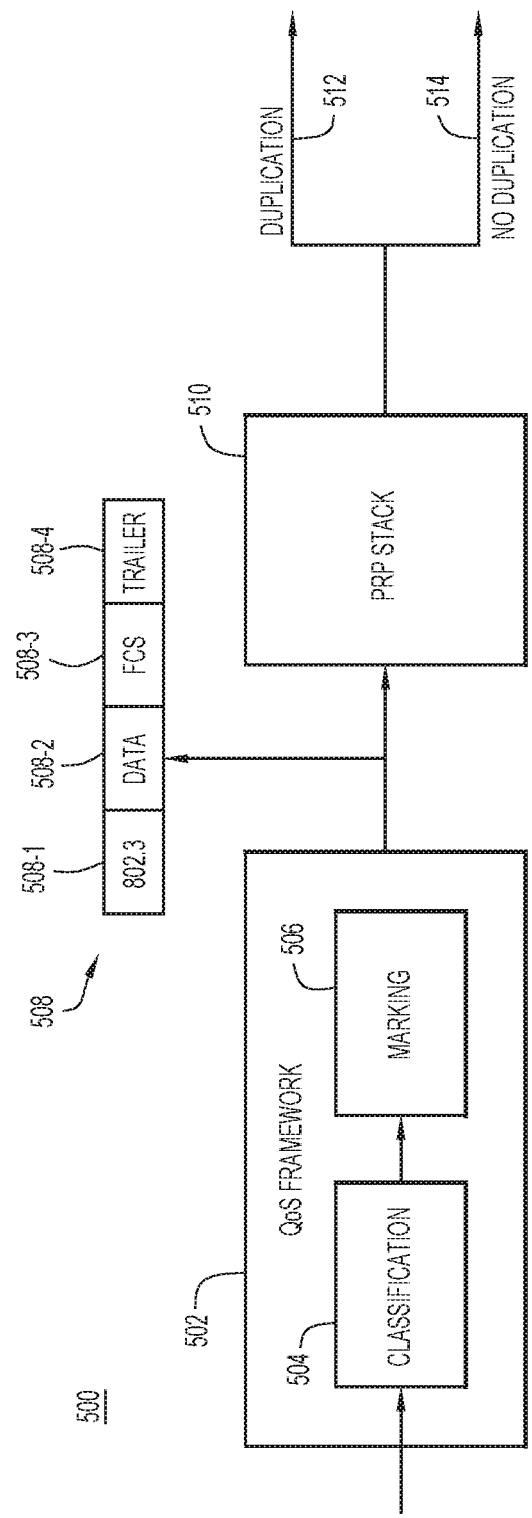
FIG. 5 is a block diagram showing a QoS-based wireless PRP process for a wireless bridge device, according to an example embodiment.

FIG. 5 is a block diagram showing a QoS-based wireless PRP process 500 for a WBD according to an example embodiment. The WBD may be the master WBD 208 shown in FIG. 2. The process 500 includes a QoS framework 502 that includes a classification operation 504 and a marking operation 506. A packet is input to the classification operation 504 that classifies the packet based on a predetermined QoS policy. For example, a packet of voice data, control messages, or CCTV frames can be classified as a first type of packet (high priority packet) and a packet of a network request can be classified as a second type of packet (low priority packet). This example of classification is not meant to be limiting. Other types of packet classification may be employed. For example, a packet may be designated a high priority packet if it originated from a group of predetermined clients or from a particular location.

Figure 6:
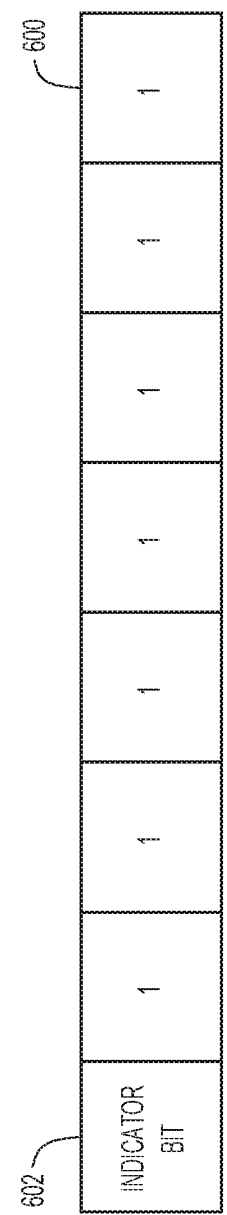
FIG. 6 is an example format of a trailer for a packet transmitted according to the techniques presented herein.

After a packet is classified, it is subject to the marking operation 506. The marking operation 506 is configured to mark a packet based on its class by, for example, giving the packet a packet type indicator. In one example, a packet passing through the classification operation 504 can be marked as either PRP-capable or PRP-incapable. For example, a PRP-capable packet is to be duplicated by a PRP stack before it is forwarded upstream, while a PRP-incapable packet will not be duplicated. In one embodiment, the marking operation 506 can be performed by using the least significant bit (or other bit) of a trailer attached to a packet. FIG. 6 illustrates an example format of a trailer 600. The trailer 600 includes one byte of data including the least significant bit 602. The least significant bit 602 in the trailer 600 can be configured to be a packet type indicator as a marking for the packet. For example, values 0 and 1 in the least significant bit 602 may indicate that the packet is PRP-capable and PRP-incapable, respectively.

Referring back to FIG. 5, after the packet is processed in the QoS framework 502, it is output to a PRP software stack 510. An example packet 508 output from the QoS framework 502 is shown in FIG. 5. The packet 508 includes a header 508-1, a payload 508-2 carrying data, a frame check sequence (FCS) 508-3, and a trailer 508-4. Other type of information may be included in the packet. In particular, the trailer 508-4 includes a packet type indicator indicating the packet type for the packet 508, as described above.

The PRP stack 510 is configured to determine whether or not to duplicate the packet based on the packet type indicator. For example, when the packet type indicator indicates that the packet is PRP-capable, the packet is duplicated at 512. Or when the packet type indicator indicates that the packet is PRP-incapable, the packet is not duplicated at 514. In one example, when the PRP stack 510 determines that the packet does not include a packet type indicator, the PRP stack 510 duplicates the packet.

In one embodiment, the PRP stack 510 is configured to parse the trailer of the packet, strip the trailer, and forward the packet outbound according to below logic:
  If a trailer is detected and the value is 0xFF, the packet is duplicated.
  If a trailer is detected, and the value is 0xFE, the packet is not duplicated.
  If no trailer is detected (e.g., no QoS policy is applied), the packet is duplicated.

Figure 7:
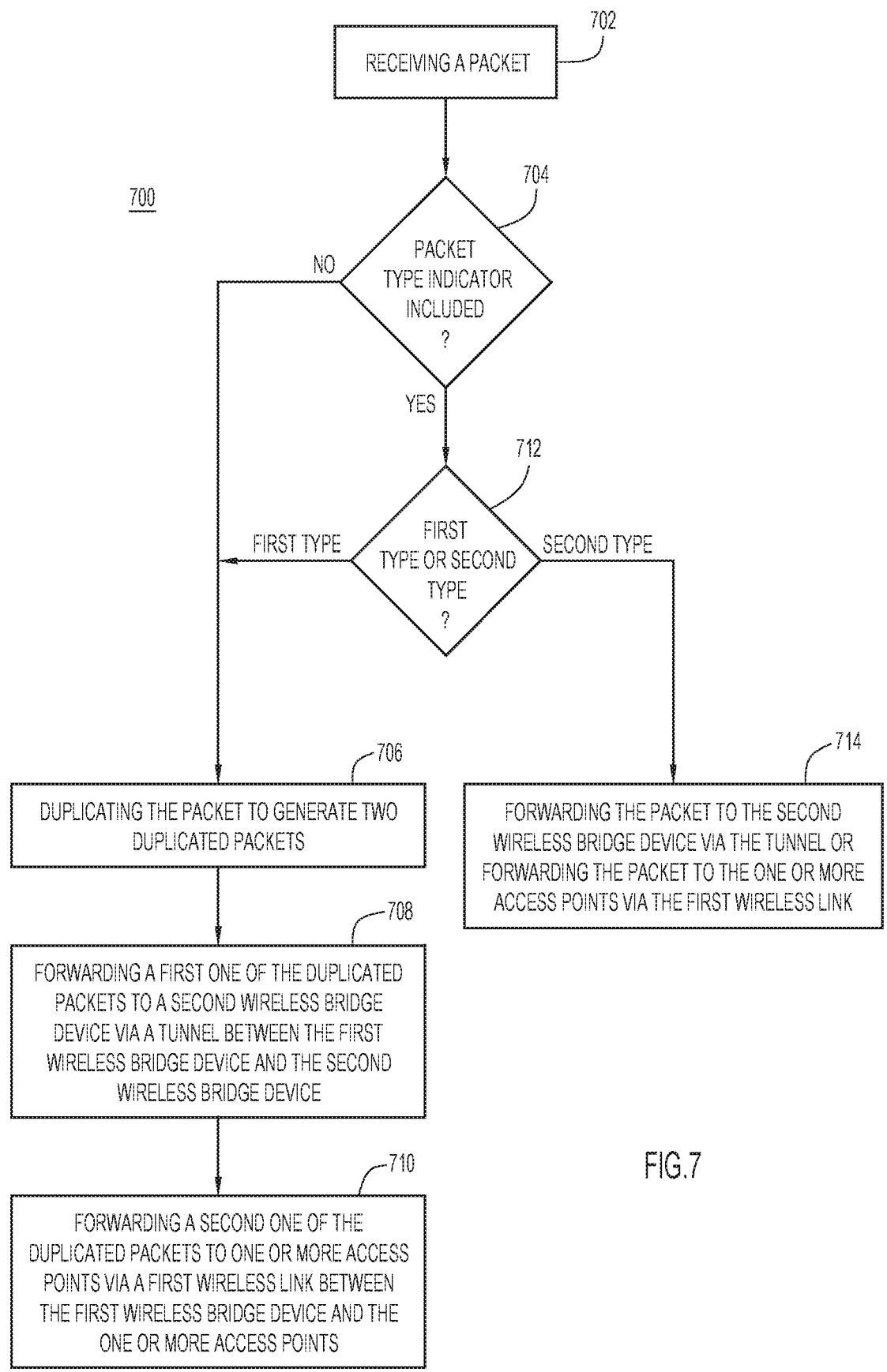
FIG. 7 is a flow chart depicting a method for providing a QoS-based PRP service to a packet, according to an example embodiment.

FIG. 7 illustrates a flow chart depicting a method 700 for providing a QoS-based PRP service to packets, according to an example embodiment. For example, the method 700 may be performed by a PRP-enabled WBD, such as the master WBD 208 depicted in FIG. 2. With reference to FIG. 7 and continuing reference to FIG. 2, at 702 a first WBD (e.g., PRP WBD 208) receives an upstream packet. At 704, the first WBD determines whether a packet type indicator is included in the packet. In response to determining that a packet type indicator is not included in the packet, at 706 the first WBD duplicates the packet to generate two duplicated packets. At 708, the first WBD forwards a first one of the duplicated packets to a second WBD (e.g., WBD 210) via a tunnel between the first WBD and the second WBD. At 710, the first WBD forwards a second one of the duplicated packets to one or more APs via a first wireless link between the first WBD and the one or more access points. If the packet indeed includes a packet type indicator (Yes at 704), at 712 the first WBD determines whether the packet is a first type (e.g., high priority packet) or a second type (e.g., low priority packet). If the packet is the first type, the WBD proceeds to perform operations 706-710 as described above. If the packet is the second type, at 714 the WBD forwards the packet to the second WBD via the tunnel or forwards the packet to the one or more APs via the first wireless link.

Figure 8:
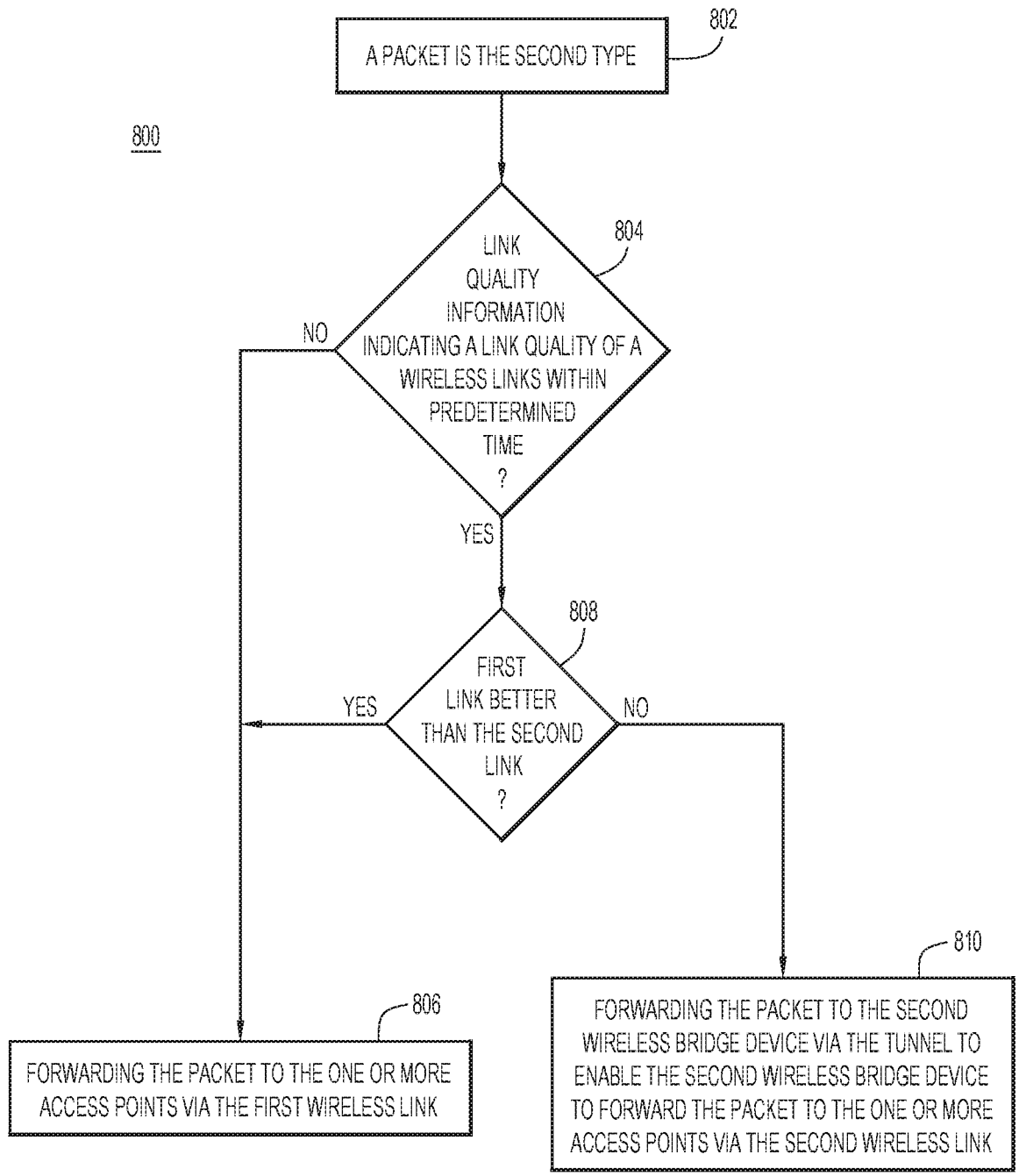
FIG. 8 is a flow chart depicting a method for forwarding a packet based on a packet type of the packet, according to an example embodiment.

FIG. 8 illustrates a flow chart depicting a method 800 for forwarding a packet based on a packet type of the packet according to an example embodiment. For example, the method 800 may be performed by a PRP-enabled WBD, such as the master WBD 208 depicted in FIG. 2. With reference to FIG. 8 and continuing reference to FIGS. 2 and 7, at 802 a first WBD (e.g., PRP WBD 208) determines that a packet is a second type (e.g., low priority packet). At 804, the first WBD determines whether within a predetermined time period it receives from a second WBD (e.g., WBD 210) via a tunnel between the first WBD and the second WBD, link quality information indicating a link quality of a second wireless link between the second WBD and the one or more access points. For example, the predetermined time period may be one second or five seconds. Any other time period may be employed based on applications. If the first WBD does not receive the link quality information from the second WBD within the predetermined time period (No at 804), at 806 the first WBD forwards the packet to the one or more APs via the first wireless link between the first WBD and the one or more APs. If the first WBD receives the link quality information from the second WBD within the predetermined time period (Yes at 804), at 808 the first WBD determines whether the link quality of the first wireless link is better than the link quality of the second wireless link. If the link quality of the first wireless link is better than the link quality of the second wireless link (Yes at 808), the first WBD forwards the packet to the one or more APs via the first wireless link at described at 806. If the link quality of the second wireless link is better than the link quality of the first wireless link (No at 808), at 810 the first WBD forwards the packet to the second WBD via the tunnel to enable the second WBD to forward the packet to the one or more APs via the second wireless link.

Figure 9:
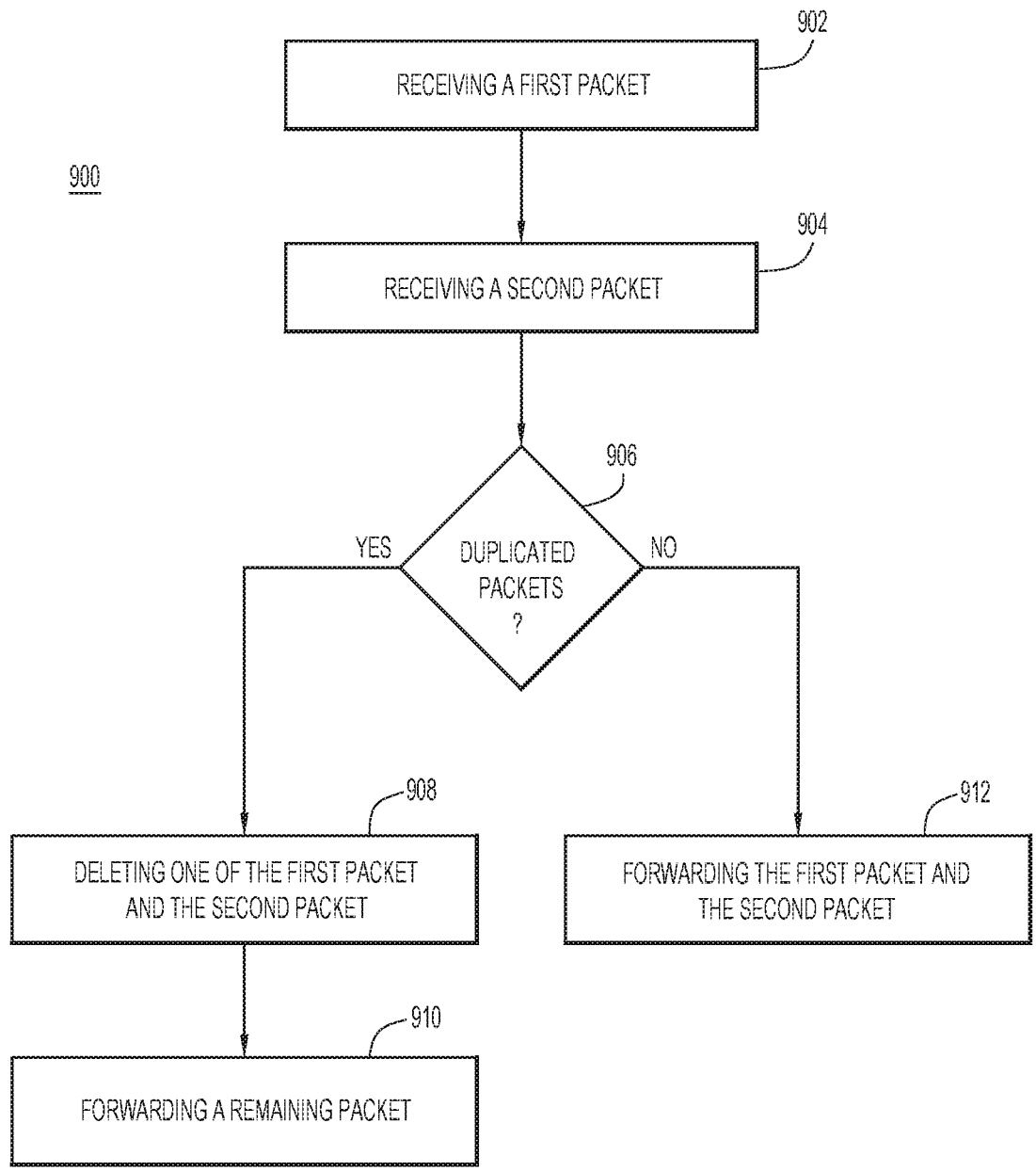
FIG. 9 is a flow chart depicting a method for processing downstream packets at PRP-enabled wireless bridge device, according to an example embodiment.

FIG. 9 illustrates a flow chart depicting a method 900 for processing downstream packets at PRP-enabled WBD according to an example embodiment. For example, the method 900 may be performed by a PRP-enabled WBD, such as the master WBD 208 depicted in FIG. 2. At 902, a PRP-enabled first WBD receives a first packet, for example, from a wireless link between the first WBD and one or more APs or from a tunnel between the first WBD and a second WBD. At 904, the first WBD receives a second packet. At 906, the first WBD determines whether the first packet and the second packet are duplicated packets. If they are duplicated packets (Yes at 906), at 908 the first WBD deletes one of the first and the second packets. At 910, the first WBD forwards the remaining packet to a downstream device, e.g., a switch or a client device. If the first packet and the second packet are not duplicated packets (No at 906), the first WBD forwards both the first and second packets to the downstream device.

Figure 10:
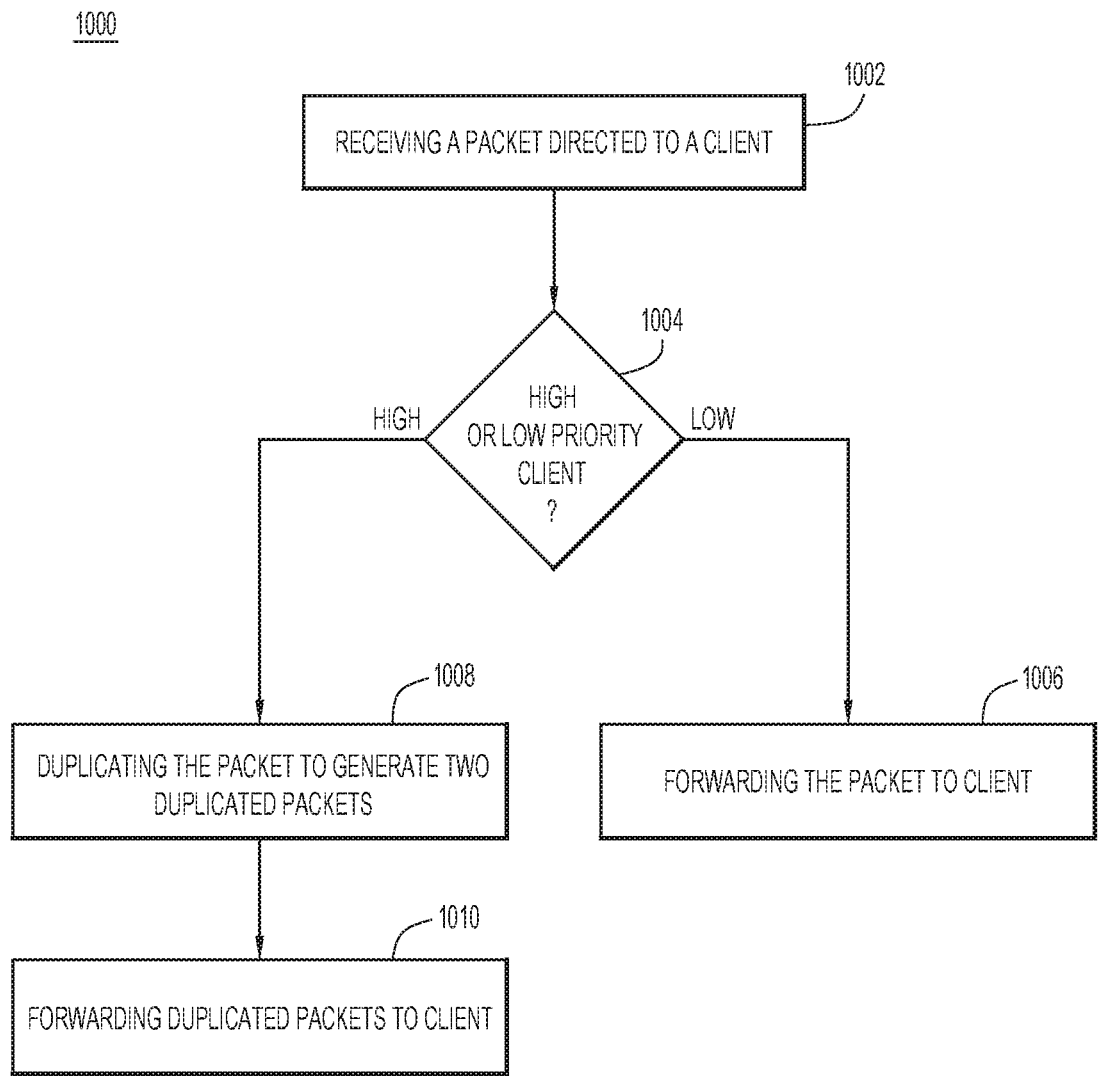
FIG. 10 is a flow chart depicting a method for processing downstream packets at a PRP-enabled switch, according to an example embodiment.

FIG. 10 illustrates a flow chart depicting a method 1000 for processing a downstream packet at a PRP-enabled switch according to an example embodiment. For example, the PRP-enabled switch may be the PRP switch 218 depicted in FIG. 2. At 1002, the switch receives a downstream packet directed to a client. The client may be a client device located on a moving vehicle. At 1004, the switch determines whether the client is a high priority client (e.g., a DAN client) or a low priority client (e.g., an SAN client). For example, the switch may store a node table information indicating whether a client is a DAN or a SAN client. In one embodiment, the switch may receive supervision frames from WBDs that indicate duplicated packets for a client are sent via different wireless links from two WBDs. This client is marked as a DAN client in the node table. The switch may also receive supervision frames from WBDs that indicate a packet for a client is not duplicated and is sent via a single wireless link from one of the WBDs. Such a client is marked as an SAN client in the node table. The switch can look up in the node table to determine whether the client is an SAN or a DAN client. If the client is an SAN client, at 1006 the switch does not duplicate the packet and forwards the packet via single wireless link to the client. If the client is a DAN client, at 1008 the switch duplicates the packets to generate two duplicated packets. At 1010, the switch forwards the duplicated packets.

Techniques presented herein provide a QoS-based PRP solution in which not every packet in a PRP communication system is duplicated. Whether or not to duplicate a packet may depend on the priority/requirement of the application. For example, a differentiated services framework can be adopted. Applications like voice, control message, or CCTV might be configured with higher priority and obtain redundant links over the air, while services like network access requests can be configured with low priority and served via single radio link. These techniques ease the wireless traffic load in the communication system.

Furthermore, the link quality of redundant links (evaluated by redundant traffic) can be used as an indicator to select a wireless link. The techniques provide a radio link selection algorithm for selecting a better link for low priority traffic.

In summary, in one form, a method is disclosed. The method includes: receiving, at a first wireless bridge device, a first packet; determining whether the first packet is a first type or a second type; in response to determining that the first packet is the first type, duplicating the first packet to generate two duplicated packets; forwarding a first one of the duplicated packets to a second wireless bridge device via a tunnel between the first wireless bridge device and the second wireless bridge device, and forwarding a second one of the duplicated packets to one or more access points via a first wireless link between the first wireless bridge device and the one or more access points; and in response to determining that the first packet is the second type, forwarding the first packet to the second wireless bridge device via the tunnel or forwarding the first packet to the one or more access points via the first wireless link.

In another form, an apparatus is disclosed. The apparatus includes a network interface that enables network communications, a processor, and a memory to store data and instructions executable by the processor. The processor is configured to execute the instructions to: receive a first packet; determine whether the first packet is a first type or a second type; in response to determining that the first packet is the first type, duplicate the first packet to generate two duplicated packets; forward a first one of the duplicated packets to a wireless bridge device via a tunnel between the apparatus and the wireless bridge device, and forward a second one of the duplicated packets to one or more access points via a first wireless link between the apparatus and the one or more access points; and in response to determining that the first packet is the second type, forward the first packet to the wireless bridge device via the tunnel or forwarding the first packet to the one or more access points via the first wireless link.

In yet another form, a non-transitory computer-readable storage media is disclosed. The non-transitory computer-readable storage media is encoded with software comprising computer executable instructions which, when executed by a processor, cause the processor to: receive, at a first wireless bridge device, a first packet; determine whether the first packet is a first type or a second type; in response to determining that the first packet is the first type, duplicate the first packet to generate two duplicated packets; forward a first one of the duplicated packets to a second wireless bridge device via a tunnel between the first wireless bridge device and the second wireless bridge device, and forward a second one of the duplicated packets to one or more access points via a first wireless link between the first wireless bridge device and the one or more access points; and in response to determining that the first packet is the second type, forward the first packet to the second wireless bridge device via the tunnel or forwarding the first packet to the one or more access points via the first wireless link.

The above description is intended by way of example only. Various modifications and structural changes may be made therein without departing from the scope of the concepts described herein and within the scope and range of equivalents of the claims.

What is claimed is:

1. A method comprising:
   receiving, at a first wireless bridge device, a first packet;
   determining whether the first packet includes a packet type indicator;
   in response to determining the first packet includes a packet type indicator, using the packet type indicator for determining whether the first packet is a first type or a second type;
   in response to either of (i) determining that the first packet does not include the packet type indicator, or (ii) determining that the first packet includes the packet type indicator and is the first type, duplicating the first packet to generate two duplicated packets;
   forwarding a first one of the duplicated packets to a second wireless bridge device via a tunnel between the first wireless bridge device and the second wireless bridge device, and forwarding a second one of the duplicated packets to one or more access points via a first wireless link between the first wireless bridge device and the one or more access points; and
   in response to determining that the first packet is the second type, forwarding the first packet to the second wireless bridge device via the tunnel or forwarding the first packet to the one or more access points via the first wireless link.

2. The method of claim 1, further comprising:
   receiving, at the first wireless bridge device from the second wireless bridge device via the tunnel, link quality information indicating a link quality of a second wireless link between the second wireless bridge device and the one or more access points;
   determining whether the first wireless link has a better link quality than the second wireless link based on the link quality information; and
   in response to determining that the first wireless link has a better link quality than the second wireless link, forwarding the first packet to the one or more access points via the first wireless link.

3. The method of claim 2, further comprising:
   in response to determining that the second wireless link has a better link quality than the first wireless link, forwarding the first packet to the second wireless bridge device via the tunnel to enable the second wireless bridge device to forward the first packet to the one or more access points via the second wireless link.

4. The method of claim 2, further comprising:
   in response to a failure to receive from the second wireless bridge device the link quality information of the second wireless link in a predetermined time period, forwarding the first packet to the one or more access points via the first wireless link.

5. The method of claim 1, wherein the first wireless bridge device includes a wireless workgroup bridge.

6. The method of claim 1, wherein the packet type indicator is in a trailer of the first packet.

7. The method of claim 1, further comprising:
   receiving a second packet from the one or more access points via the first wireless link;
   receiving a third packet from the second wireless bridge device via the tunnel;
   determining whether the second packet and the third packet are duplicated packets; and
   in response to determining that the second packet and the third packet are duplicated packets, deleting one of the second packet and the third packet and forwarding a remaining packet to a client device.

8. The method of claim 7, further comprising:
   in response to determining that the second packet and the third packet are not duplicated packets, forwarding the second packet and the third packet to the client device.

9. An apparatus comprising:
   a network interface that enables network communications;
   a processor; and
   a memory to store data and instructions executable by the processor, wherein the processor is configured to execute the instructions to:
  receive a first packet;
  determine whether the first packet includes a packet type indicator;
  in response to determining the first packet includes a packet type indicator, using the packet type indicator to determine whether the first packet is a first type or a second type;
  in response to either of (i) determining that the first packet does not include the packet type indicator, or (ii) determining that the first packet is the first type, duplicate the first packet to generate two duplicated packets;
  forward a first one of the duplicated packets to a wireless bridge device via a tunnel between the apparatus and the wireless bridge device, and forward a second one of the duplicated packets to one or more access points via a first wireless link between the apparatus and the one or more access points; and
  in response to determining that the first packet is the second type, forward the first packet to the wireless bridge device via the tunnel or forwarding the first packet to the one or more access points via the first wireless link.

10. The apparatus of claim 9, wherein the processor is further configured to:
  receive, from the wireless bridge device via the tunnel, link quality information indicating a link quality of a second wireless link between the wireless bridge device and the one or more access points;
  determine whether the first wireless link has a better link quality than the second wireless link based on the link quality information; and
  in response to determining that the first wireless link has a better link quality than the second wireless link, forward the first packet to the one or more access points via the first wireless link.

11. The apparatus of claim 10, wherein the processor is further configured to:
  in response to determining that the second wireless link has a better link quality than the first wireless link, forward the first packet to the wireless bridge device via the tunnel to enable the wireless bridge device to forward the first packet to the one or more access points via the second wireless link.

12. The apparatus of claim 10, wherein the processor is further configured to:
  in response to a failure to receive from the wireless bridge device the link quality information of the second wireless link in a predetermined time period, forward the first packet to the one or more access points via the first wireless link.

13. The apparatus of claim 9, wherein
  the wireless bridge device includes a wireless workgroup bridge.

14. The apparatus of claim 9, wherein the processor is further configured to:
  receive a second packet from the one or more access points via the first wireless link;
  receive a third packet from the wireless bridge device via the tunnel;
  determine whether the second packet and the third packet are duplicated packets; and
  in response to determining that the second packet and the third packet are duplicated packets, delete one of the second packet and the third packet and forward a remaining packet to a client device.

15. The apparatus of claim 14, further comprising:
  in response to determining that the second packet and the third packet are not duplicated packets, forward the second packet and the third packet to the client device.

16. A non-transitory computer-readable storage media encoded with software comprising computer executable instructions which, when executed by a processor, cause the processor to:
  receive, at a first wireless bridge device, a first packet;
  determine whether the first packet includes a packet type indicator;
  in response to determining the first packet includes a packet type indicator, using the packet type indicator to determine whether the first packet is a first type or a second type;
  in response to either of (i) determining that the first packet does not include the packet type indicator, or (ii) determining that the first packet is the first type, duplicate the first packet to generate two duplicated packets;
  forward a first one of the duplicated packets to a second wireless bridge device via a tunnel between the first wireless bridge device and the second wireless bridge device, and forward a second one of the duplicated packets to one or more access points via a first wireless link between the first wireless bridge device and the one or more access points; and
  in response to determining that the first packet is the second type, forward the first packet to the second wireless bridge device via the tunnel or forwarding the first packet to the one or more access points via the first wireless link.

17. The non-transitory computer-readable storage media of claim 16, wherein the instructions cause the processor to:
  receive, at the first wireless bridge device from the second wireless bridge device via the tunnel, link quality information indicating a link quality of a second wireless link between the second wireless bridge device and the one or more access points;
  determine whether the first wireless link has a better link quality than the second wireless link based on the link quality information; and
  in response to determining that the first wireless link has a better link quality than the second wireless link, forward the first packet to the one or more access points via the first wireless link.

18. The non-transitory computer-readable storage media of claim 17, wherein the processor is further configured to:
  in response to determining that the second wireless link has a better link quality than the first wireless link, forward the first packet to the second wireless bridge device via the tunnel to enable the second wireless bridge device to forward the first packet to the one or more access points via the second wireless link.

19. The non-transitory computer-readable storage media of claim 16, wherein
  the first wireless bridge device includes a wireless workgroup bridge.

20. The non-transitory computer-readable storage media of claim 16, wherein the instructions cause the processor to:
  receive a second packet from the one or more access points via the first wireless link;
  receive a third packet from the second wireless bridge device via the tunnel;
  determine whether the second packet and the third packet are duplicated packets; and in response to determining that the second packet and the third packet are duplicated packets, delete one of the second packet and the third packet and forward a remaining packet to a client device.

\* \* \* \* \*